United States Patent Office 3,637,811
Patented Jan. 25, 1972

3,637,811
PRODUCTION OF ORGANIC ISOCYANATES
Karl-Friedrich Zenner and Günter Oertel, Cologne-Flittard, and Hans Holtschmidt, Leverkusen-Steinbuechel, Germany, assignors to Farbenfabriken Bayer Aktiengesellschaft, Leverkusen, Germany
No Drawing. Filed Nov. 21, 1967, Ser. No. 684,638
Claims priority, application Germany, Nov. 30, 1966,
F 50,801
Int. Cl. C07c 125/06
U.S. Cl. 260—482 C                    5 Claims

ABSTRACT OF THE DISCLOSURE

N-hydrocarbyl - N - isocyanatomethyl-carbamic acid esters and their preparation by reaction of N-hydrocarbyl-N-halomethylcarbamic acid esters with metal cyanates.

This invention relates to organic isocyanates and to methods of preparing the same. More particularly, it relates to organic isocyanates prepared from a metal cyanate, especially the alkali and alkaline earth metal cyanates.

Heretofore, organic isocyanates have been prepared by the reaction of amine salts with phosgene. This method is generally effective where simple isocyanates are desired. However, where more complex isocyanates are desired, the process becomes expensive due to the difficulty and expense involved in obtaining the appropriate diamine. Moreover, the phosgenation reaction employs dangerous and toxic materials and is difficult to control and does not give good yields in all cases. It is known that organic isocyanates can be prepared by reacting organic sulfates with alkali metal cyanates. However, due to the presence of sulfur dioxide resulting from the decomposition of the sulfate, the isocyanate has a tendency to polymerize, resulting in low yields. It is also known that alkyl halides can be reacted with heavy metal cyanates such as silver or mercury cyanates. Attempts have been made to replace the silver and mercury cyanates in these reactions with alkali metal or alkaline earth metal cyanates such as by the processes described in U.S. Pats. 2,866,801 and 3,017,420. However, these attempts have not met with much success since these materials are less reactive and the products produced in most instances are not the isocyanates but the isocyanurates. In the process described in U.S. Pat. 3,017,420, alkyl halides are reacted at elevated temperature with alkali metal or alkaline earth metal cyanates in the presence of polar solvents, for example, sulphones or tertiary acid amides such as diphenyl sulphone or dimethyl formamide, producing poor yields of isocyanates. In order to suppress the simultaneous formation of isocyanurates, the resulting monomeric isocyanate must be removed from the reaction mixture as repidly as possible. In this process, however, since the reaction between the alkyl halide and the alkali metal or alkaline earth metal cyanate is relatively slow, satisfactory yield of monomeric isocyanate can only be obtained at an extremely slow rate of conversion. In the process disclosed in U.S. Pat. 2,866,801, suppression of the formation of isocyanurates has been attempted by chilling the reaction mixture after a brief reaction time. The isocyanate yield remains consistently low in this process, since, in addition to unreacted starting material, a considerable amount of isocyanurate is obtained. Moreover, all of these processes have the disadvantage that the isolation of the monomeric isocyanate requires a costly separation of the unreacted alkyl halide which has a similar boiling point. The formation of isocyanurates is, for the most part, avoided in the production of α-halogen ethers by a process disclosed in German Pat. 1,205,087 in which α-halogen ethers are reacted with alkali metal or alkaline earth metal cyanates in mixtures of a polar and a non-polar solvent.

Therefore, it is an object of this invention to provide organic isocyanates and a method for producing organic isocyanates which are not subject to the heretofore stated disadvantages. It is an object of this invention to produce organic isocyanates by a process resulting in good yields of isocyanates. An object of this invention is to provide a method for producing organic isocyanates in good yields. Another object of this invention is to provide for the production of monomeric organic isocyanates without the formation of substantial quantities of polymeric products. An additional object of this invention is to provide monomeric organic isocyanate prepared from metal cyanates without the formation of substantial quantities of polymeric products. Additionally, an object of this invention is to provide a method for the production of monomeric organic isocyanates from metal cyanates without the formation of substantial quantities of polymeric products and without the necessity of utilizing particular solvent mixtures.

The foregoing objects and others, which will become apparent from the following description are accomplished in accordance with this invention, generally speaking, by providing monomeric organic isocyanates and a process for the preparation of monomeric organic isocyanates by reacting N-hydrocarbyl-N-halomethyl-carbamic acid esters with metal cyanates. More particularly, in a preferred embodiment this invention concerns N-hydrocarbyl-N-isocyanatomethyl-carbamic acid esters and a process of preparing said esters by reacting N-hydrocarbyl-N-chloromethyl-carbamic acid esters with alkali metal or alkaline earth metal cyanates at a temperature of from about 30° to about 230° C.

Reactions between N-chloromethyl compounds, N-chloromethylacylamine-compounds in particular, and alkali metal or alkaline earth metal cyanates, have never been described in the literature. Attempts to react any N-chloromethyl-acylamine-compound, such as N-chloromethyl-N-methacetamide or N-chloromethyl-phthalimide, with alkali metal or alkaline earth metal cyanates under the conditions of the process according to the present invention, will show, as the comparison tests show, that there is either no reaction at all, or that polymeric products are formed.

Whereas N-methyl-N-chloromethyl acetamide which has the formula

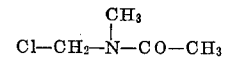

does not react with sodium cyanate under the aforementioned conditions, the structurally very similar N-methyl-N-chloromethyl-carbamic acid methyl ester which has the formula

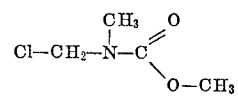

reacts quickly and in high yields with sodium cyanate to form the corresponding N-methyl-N-isocyanatomethyl-carbamic acid methyl ester. In this process, polymeric products are only formed in very small quantities, which is not the case with N-chloromethyl-phthalimide. Accordingly, the present invention is based on the unexpected observation that, unlike other, structurally very similar, N-alkyl-N-chloromethyl acylamino compounds, hydrocarbyl-N-halomethyl-carbamic acid esters corresponding to the general formula set forth hereinafter, react with alkali metal or alkaline earth metal cyanates under suitable reaction conditions to form N-hydrocarbyl-N-isocyanatomethyl-carbamic acid esters corresponding to the general formula given below.

The N-hydrocarbyl-N-isocyanatomethyl-carbamic acid esters produced by this invention correspond to the formula

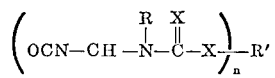

wherein R represents a monovalent branched or non-branched, saturated or unsaturated hydrocarbyl radical which may or may not be substituted with substituents inert to isocyanato groups, X represents oxygen or sulphur, R' represents a mono- or divalent branched or non-branched, saturated or unsaturated hydrocarbyl radical which may or may not be substituted with substituents inert to isocyanato groups and the $n$ represents 1 or 2. The hydrocarbyl radical represented by R may be aliphatic, for example, alkyl, cycloaliphatic or aromatic, for example, araliphatic, hydrocarbon radicals, optionally substituted with inert substituents such as halogen, for example, chloro, or cyano radicals. The hydrocarbyl radical preferably contains from about 1 to 12 carbon atoms. The hydrocarbyl radical represented by R' may be aliphatic, for example, alkyl, cycloaliphatic or aromatic, including araliphatic, optionally substituted with inert substituents such as halogen radicals, for example, chlorine. The hydrocarbyl radical preferably contains from about 1 to 15 carbon atoms.

Among the suitable N-hydrocarbyl-N-halomethyl-carbamic acid esters are those corresponding to the formula:

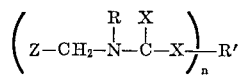

wherein R, R', X and $n$ have the meanings set forth above and Z represents a halogen radical, such as, for example, fluorine, chlorine, bromine or iodine, preferably chlorine. Among the N-hydrocarbyl-N-halomethyl-carbamic acid esters suitable for reaction with the metal cyanates are the following representative examples:

N-methyl-N-chloromethyl-carbamic acid methyl ester,
N-methyl-N-chloromethyl-carbamic acid ethyl ester,
N-methyl-N-chloromethyl-carbamic acid-2-chloroethyl ester,
N-methyl-N-chloromethyl-carbamic acid isopropyl ester,
N-methyl-N-chloromethyl-carbamic acid allyl ester,
N-methyl-N-chloromethyl-carbamic acid n-hexyl ester,
N-methyl-N-chloromethyl-carbamic acid n-dodecyl ester,
N-methyl-N-chloromethyl-carbamic acid cyclohexyl ester,
N-methyl-N-chloromethyl-carbamic acid benzyl ester,
N-methyl-N-chloromethyl-carbamic acid phenyl ester,
N-methyl-N-chloromethyl-carbamic acid-p-chlorophenyl ester,
N-methyl-N-chloromethyl-carbamic acid-2-naphthyl ester,
N-ethyl-N-chloromethyl-carbamic acid methyl ester,
N-n-propyl-N-chloromethyl-carbamic acid methyl ester,
N-isopropyl-N-chloromethyl-carbamic acid methyl ester,
N-n-butyl-N-chloromethyl-carbamic acid methyl ester,
N-isobutyl-N-chloromethyl-carbamic acid methyl ester,
N-n-dodecyl-N-chloromethyl-carbamic acid methyl ester,
N-allyl-N-chloromethyl-carbamic acid methyl ester,
N-cyclohexyl-N-chloromethyl-carbamic acid methyl ester,
N-benzyl-N-chloromethyl-carbamic acid methyl ester,
N-p-chlorobenzyl-N-chloromethyl-carbamic acid methyl ester,
N-cyanomethyl-N-chloromethyl-carbamic acid methyl ester,
N-methyl-N-chloromethyl-thiocarbamic acid-S-n-butyl ester,
N-methyl-N-chloromethyl-thiocarbamic acid-S-allyl ester,
N-methyl-N-chloromethyl-thiocarbamic acid-O-methyl ester,
N-methyl-N-chloromethyl-thiocarbamic acid-O-propyl ester,
and the like, as well as the bis-N-methyl-N-chloromethyl-carbamic acid esters of ethylene glycol, propylene glycol, tripropylene glycol, butene(2)-1,4 diol, hydroquinone, resorcinol, cyclohexane-1,4-diol and 2,2-di-[4-hydroxyphenyl]-propane and the like. The N-hydrocarbyl-N-halomethyl-carbamic acid esters used as starting materials in accordance with the present invention, are for the most part known compounds and can be obtained, for example, by the process described in German Pat. 1,-153,756. The corresponding fluoro-, bromo- or iodo-N-hydrocarbyl-N-halomethyl-carbamic acid esters may be employed.

The N-hydrocarbyl-N-halomethyl-carbamic acid esters corresponding to the formula

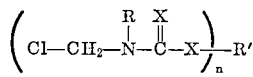

wherein R, R', X and $n$ are as defined above are preferred; that is, the preferred esters are the N-hydrocarbyl-N-chloromethyl-carbamic acid esters.

Any suitable metal cyanate may be used, preferably the alkali metal and alkali earth metal cyanates such as those of lithium, sodium, potassium, and the like, and calcium, magnesium, strontium, barium and the like. Mixtures of suitable cyanates may also be employed. Examples of suitable cyanates include lithium cyanate, sodium cyanate, potassium cyanate, calcium cyanate, strontium cyanate, barium cyanate, and the like.

The reaction of the N-hydrocarbyl-N-halomethyl-carbamic-acid esters and the metal cyanates may be carried out in the presence of inert diluents or the reaction may also be carried out in bulk without inert diluents. Suitable inert diluents include those which do not themselves react with isocyanates, that is, the inert diluents do not contain any Zerewitinoff-active hydrogen atoms in the molecules. Any suitable inert organic or inorganic diluents may be used, such as, for example, organic diluents such as benzene, toluene, xylene, kerosene, chlorobenzene, mineral oil, nitrobenzene, benzonitrile, benzyl cyanide, methyl benzoate, hexane, octane, cyclohexane, light gasolines, petroleum, acetonitrile, propionitrile, stearic acid nitrile, adipic acid dinitrile, tetrahydrofuran, anisole, dioxane, ethylene glycol, dmethyl ether, diethylene glycol, dimethyl ether, nitromethane, dimethyl sulphone, diethyl sulphone, dicyclohexyl sulphone, diphenyl sulphone, tetramethylene sulphone, ethyl acetate, dimethyl acetamide, dimethyl formamide, diethyl formamide, N-methyl-N-ethyl formamide, acetone, methyl ethyl ketone and the like and inorganic diluents such as, for example, liquid sulphur dioxide and the like. The process may also be carried out in the presence of a mixture of two or more suitable diluents.

Although the process may be carried out in the absence of a suitable diluent, it is preferred to use one or more of the suitable diluents in order to obtain high yields. Since the reaction between the N-hydrocarbyl-N-halomethyl-carbamic acid esters and the metal cyanates takes place more rapidly in polar diluents with a dielectric constant greater than 15, such as, for example, tertiary acid amides, sulphones or nitriles, than in non-polar diluents, such as hydrocarbons or halogenated hydrocarbons, it is preferred that when polar diluents, such as those having a dielectric constant greater than 15 are used, to use them in admixture with less polar or non-polar diluents in order to avoid secondary reactions and to obtain better yields, such as is disclosed in German Pat. 1,205,087. However, it is to be noted that the present invention is not limited to the use of particular diluent mixtures as is the case with the process according to German Pat. 1,205,087. The process according to this invention may employ any suitable diluent or diluent mixture or may even be conducted in the absence of a diluent.

The reaction between the N-hydrocarbyl-N-halomethyl-carbamic acid esters and the metal cyanates takes place at a considerable rate, even in the absence of catalysts, at temperatures as low as ambient temperatures of approximately 30° C., but is preferably carried out at a temperature in the range of about 30° to about 230° C., more preferably at a temperature in the range of about 60° to about 160° C.

Although, as indicated above, the reaction may be carried out in the absence of catalysts, any suitable catalysts, such as, for example, quaternary ammonium halides and the like, may be employed if desirable. Any suitable quaternary ammonium halide catalyst, such as, for example, those disclosed in U.S. Pat. 2,866,802 may be employed.

The reaction of this invention may be conducted at normal pressures, for example, atmospheric pressure or at elevated pressures. The pressure used during any particular reaction should be sufficient to avoid volatilization of the starting materials.

The reaction times for the process of this invention are governed by the type of N-hydrocarbyl-N-halomethyl-carbamic acid esters used, by the reaction temperature and pressure and by the nature of the diluent or diluent mixture employed. The reaction times are, in general, from about 0.1 to about 20 hours.

The optimum reaction temperatures, reaction pressures and reaction times may be easily and readily determined by routine empirical methods by those skilled in the art.

Since the metal cyanates are almost insoluble in the reaction medium, the metal cyanates are preferably used in a finely divided form. The N-hydrocarbyl-N-halomethyl-carbamic acid esters are preferably heated together with the metal cyanate in the diluent or diluent mixture, or alternatively the esters are added gradually to a suspension of the metal cyanates in the diluents.

The suitable proportions of the reactants can be varied over a wide range. Molar equivalents of metal cyanates and N-hydrocarbyl-N-halomethyl-carbamic acid esters may be used, but preferably the metal cyanate is used in excess, such as, for example, about 0.5 to about 25 mol percent higher.

In the process according to this invention the reaction between the N-hydrocarbyl-N-halomethyl-carbamic acid esters and the metal cyanates is essentially quantitative in relation to the N-hydrocarbyl-N-halomethyl carbamic acid ester compounds used, and as a result, the problem affecting heretofore known processes, that is, that of separating the starting materials from the reaction product is relatively simple. Even without special purification, the isocyanates formed during the reaction are extremely pure. In many instances, the crude solutions obtained after solid products are removed by filtration, and whose isocyanate content may readily be determined by standard methods readily apparent to those skilled in the art, are completely acceptable for further reactions.

The isocyanates are easy to isolate by separating off the inorganic salts by filtration and recovering the isocyanates by distillation from the filtrate or by distilling the isocyanate directly from the reaction mixture. Means of separating isocyanate product from inorganic salts and inert diluent, if used, will be readily apparent to those skilled in the art. Suitable means for separation, depending upon the state of the components, include processes, such as, for example, filtration, fractional crystallization, fractional distillation and the like.

The invention is further illustrated but not limited by the following examples in which all parts and percentages are by weight unless otherwise specified.

EXAMPLE 1

About 150 parts by weight of sodium cyanate are suspended in about 400 parts by volume of acetonitrile and about 176 parts by weight of N-methyl-N-chloromethyl carbamic acid methyl ester are added to the resulting suspension. The mixture is boiled under reflux with stirring until all the chlorine in the N-methyl-N-chloromethyl-carbamic acid ester has reacted (which takes about two hours). After the organic salts have been filtered off, the solvent is distilled off through a small column, either at normal pressure or at reduced pressure. Vacuum distillation of the residue yields about 131 parts by weight (about 71% of the theoretical) of N-methyl-N-isocyanato-methyl-carbamic acid methyl ester. The properties were determined to be as follows: B.P. 92° C./11 torr. and 61° C./0.2 torr; $n_D^{20}$=1.4433; NCO content=29.1% (calc. 29.2%).

EXAMPLE 2

A mixture of about 2375 parts by volume of benzene, about 125 parts by volume of acetonitrile, about 900 parts by weight of sodium cyanate and about 1375 parts by weight of N-methyl-N-chloromethyl-carbamic acid methyl ester, is boiled for about 10 hours under reflux until all the chlorine has reacted. Working up as described in Example 1 yields about 1300 parts by weight (about 90% of the theoretical) of N-methyl-N-isocyanatomethyl-carbamic acid methyl ester with the properties described in Example 1.

EXAMPLE 3

A mixture of about 150 parts by volume of propionitrile, about 350 parts by volume of toluene, about 180 parts by weight of sodium cyanate and about 236 parts by weight of N-methyl-N-chloromethyl-carbamic acid methyl ester, is kept at a temperature of about 110° C. for about 1½ hours with stirring in a V4A-autoclave. Working up as described in Example 1 yields about 206 parts by weight (about 83% of the theoretical) of N-methyl-N-isocyanatomethyl-carbamic acid methyl ester with the properties described in Example 1.

EXAMPLE 4

A mixture of about 100 parts by volume by benzene, about 200 parts by volume of toluene, about 100 parts by volume of acetonitrile, about 160 parts by weight of potassium cyanate and about 139 parts by weight of N-methyl-N - chloromethyl - carbamic acid methyl ester is boiled under reflux for about 8 hours until all the chlorine has reacted. Working up as described in Example 1 yields about 104 parts by weight (about 72% of the theoretical) of N-methyl-N-isocyanatomethyl-carbamic acid methyl ester with the described properties in Example 1.

EXAMPLE 5

A mixture of about 200 parts by volume of propionitrile, about 100 parts by volume of lithium cyanate and about 138 parts by weight of N-methyl-N-chloromethyl-carbamic acid methyl ester, is boiled under reflux for about two hours until all the chlorine has reacted. Working up as described in Example 1 yields about 94 parts by weight (about 65% of the theoretical) of N-methyl-N-isocyanatomethyl-carbamic acid methyl ester with the described properties in Example 1.

EXAMPLE 6

A mixture of about 380 parts by volume of toluene, about 20 parts by volume of acetonitrile, about 110 parts by weight of sodium cyanate and about 180 parts by weight of N-methyl-N-chloromethyl-carbamic acid ethyl ester, is boiled under reflux for about 7 hours until all the chlorine has reacted. Working up as described in Example 1 yields about 161 parts by weight (about 85% of the theoretical) of N - methyl-N-isocyanato-methyl-carbamic acid ethyl ester. The properties were determined to be as follows: B.P. 47–48° C./0.09 Torr and $n_D^{20}$=1.4391; NCO content=26.5% (cal. 26.6%).

EXAMPLE 7

A mixture of baout 475 parts by volume of toluene, about 155 parts by volume of acetonitrile, about 130 parts by weight of sodium cyanate and about 310 parts by weight of N-methyl-N-chloromethyl-carbamic acid phenyl ester is boiled under reflux for about 8 hours until all the chlorine has reacted. Standard titration of the NCO content of the solution, from which the organic salts have been removed, shows a yield of about 92% of the theoretical. Working up a distillation yields about 230 parts by weight (about 71% of the theoretical) of N-methyl-N-isocyanatomethyl-carbamic acid phenyl ester. The properties were determined to be as follows: B.P. 136–138° C./0.25 Torr and $n_D^{20}=1.5224$; NCO content=20.25% (cal. 20.40%).

EXAMPLE 8

A mixture of about 225 parts by volume of benzene, about 325 parts by volume of acetonitrile, about 40 parts by weight of sodium cyanate and about 72 parts by weight of N-methyl-N-chloromethyl-carbamic acid-S-n-butyl ester, is boiled under reflux for about 6 hours until all the chlorine has reacted. Titration of the NCO-content of the filtered solution shows a yield of about 85% of the theoretical. Working up by distillation yields about 50 parts by weight (about 67% of the theoretical) of N-methyl-N-isocyanatomethyl carbamic acid-S-n-butyl ester. The properties were determined to be as follows: B.P. 99–100° C./0.18 Torr; $n_D^{20}=1.4981$; NCO content 20.7% (cal. 20.8%).

EXAMPLE 9

A mixture of about 400 parts by volume of chlorobenzene, about 100 parts by weight of sodium cyanate and about 115 parts by weight of N-methyl-N-chloromethyl-carbamic acid methyl ester, is kept at a temperature of about 135° C. for about three hours. Titration of the NCO content of the filtered solution shows a yield of about 91% of the theoretical. Working up by distillation yields about 101 parts by weight (about 85% of the theoretical) of N-methyl-N-isocyanatomethyl-carbamic acid methyl ester with the properties described in Example 1.

Comparison Test I

A mixture of about 400 parts by volume of acetonitrile, about 122 parts by weight of N-chloromethyl-N-methyl-acetamide and about 200 parts by weight of sodium cyanate, is refluxed for about 20 hours with stirring. The inorganic salt is filtered off, washed with acetonitrile and dried. Analysis shows that it consists of sodium cyanate and does not contain any ionic chlorine. The filtrate can be separated by fractional distillation into acetonitrile (B.P. 80° C.) and N-chloromethyl-N-methylacetamide (B.P. 85–87° C./Torr).

Comparison Test II

A mixture of about 400 parts by volume of acetonitrile, about 130 parts by weight of sodium cyanate, about 196 parts by weight of N-chloromethyl-phthalimide is refluxed for about 20 hours with stirring. The inorganic salt is filtered off, washed with acetonitrile and dried. About 150 parts by weight of salt are obtained. It is not completely soluble in water. After drying, the water-insoluble component comprises about 21 parts by weight of a white amorphous powder with a melting point above about 330° C. which is not soluble in organic solvents, apart from hot dimethyl sulphoxide. It is concluded from the analytical data of the white powder that it is polymeric N-phthalimido methyl isocyanate.

*Analysis.*—Calculated (percent): C, 59.41; H, 2.97; O, 23.76; N, 13.86. Found (percent): C, 58.83; H, 3.17; O, 24.07; N, 13.59.

N-chloromethyl phthalimide can be recovered by concentrating the filtrate in which no monomeric isocyanate can be detected.

The novel mono- or polyfunctional N-hydrocarbyl-N-isocyanatomethyl-carbamic acid esters obtained in good yields by the process of this invention are usually colorless, more or less viscous liquids of high purity. These isocyanates may be stored for almost unlimited periods in the absence of air and moisture. The isocyanates are valuable intermediate products and may be used, for example, in the production of leather auxiliaries, pesticides, dyestuffs and pharmaceuticals. The polyfunctional isocyanates are suitable as precursors for resins and other polymeric materials such as polyurethanes and polyureas in the form of films, fibers and foams made according to heretofore known processes. Additionally, the monoisocyanates are useful in applications similar to those for known isocyanates, such as, for example, treating agents for textiles, leather, paper and the like. Especially the monoisocyanates are useful as gelatin hardeners.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

EXAMPLE 10

A mixture of 40 parts by volume of tetramethylene sulfone, 360 parts by volume of benzene, 110 parts by weight of sodium cyanate and 170 parts by weight of N-methyl-N-chloromethyl carbamic acid methyl ester is boiled under reflux for two hours. Titration of the NCO-content of the filtered solution which is free of hydrolyzable chlorine results in a yield of 95 percent of the theoretical of N-methyl-N-isocyanatomethyl carbamic acid methyl ester.

EXAMPLE 11

A mixture of 40 parts by volume of dimethyl formamide, 380 parts by volume of benzene, 120 parts by weight of sodium cyanate and 170 parts by weight of N-methyl-N-chloromethyl carbamic acid methyl ester is boiled under reflux for five hours and worked up as indicated in Example 10. The yield in solution is 81 percent of the theoretical.

EXAMPLE 12

A mixture of 40 parts by volume of N-methyl pyrrolidone, 360 parts by volume of benzene, 110 parts by weight of sodium cyanate and 170 parts by weight of N-methyl-N-chloromethyl carbamic acid methyl ester is boiled under reflux for 2½ hours and worked up as indicated in Example 10. The yield in solution is 95 percent of the theoretical.

EXAMPLE 13

A mixture of 50 parts by volume of benzonitrile, 200 parts by volume of light benzine (B.P. 60–95°), 97 parts by weight of N-methyl-N-chloromethyl carbamic acid methyl ester and 68 parts by weight of sodium cyanate is boiled under reflux for seven hours and worked up as indicated in Example 10. The yield in solution is 96 percent of the theoretical.

EXAMPLE 14

A mixture of 400 parts by volume of methyl ethyl ketone, 120 parts by weight of sodium cyanate and 170 parts by weight of N-methyl-N-chloromethyl carbamic acid methyl ester is boiled under reflux for 5½ hours and worked up as indicated in Example 10. The yield in solution is 80 percent of the theoretical.

EXAMPLE 15

A mixture of 400 parts by volume of acetic acid ethyl ester, 120 parts by weight of sodium cyanate and 170 parts by weight of N-methyl-N-chloromethyl carbamic acid methyl ester is boiled under reflux for 7½ hours and worked up as described in Example 10. The yield in solution is 92 percent of the theoretical.

EXAMPLE 16

A mixture of 225 parts by volume of ethylene glycol dimethyl ether, 96 parts by weight of N-methyl-N-chloromethyl carbamic acid methyl ester and 68 parts by weight of sodium cyanate is boiled under reflux for three hours and worked up as indicated in Example 10. The yield in solution is 91 percent of the theoretical.

EXAMPLE 17

A mixture of 60 parts by volume of acetonitrile, 540 parts by volume of toluene, 140 parts by weight of sodium cyanate and 249 parts by weight of N-ethyl-N-chloromethyl carbamic acid ethyl ester is boiled under reflux for three hours, until all of the chlorine has reacted. Standard titration of the NCO-content of the solution from which the inorganic salts have been removed shows a yield of 91 percent of the theoretical. Working up by distillation yields 210 parts by weight (79 percent of the theoretical) of N-ethyl-N-isocyanato methyl carbamic acid ethyl ester.

B.P.: 53° C./0.45 Torr and $n_D^{20}$: 1.4394; NCO-content: 24.2 percent (calculated 24.45 percent).

EXAMPLE 18

A mixture of 360 parts by volume of toluene, 40 parts by volume of aceto nitrile, 98 parts by weight of sodium cyanate and 166 parts by weight of N-n-propyl-N-chloromethyl carbamic acid methyl ester is boiled under reflux for six hours, until all of the chlorine has reacted. Titration of the NCO-content of the solution from which the inorganic salts have been removed shows a yield of 86 percent of the theoretical. Working up by distillation yields 127 parts by weight (74 percent of the theoretical) of N-n-propyl-N-isocyanato methyl carbamic acid methyl ester.

B.P.: 69–70°/1.5 Torr and $n_D^{20}$:1,4445; NCO-content: 24.40 percent (calculated 24.45 percent).

EXAMPLE 19

A mixture of 320 parts by volume of toluene, 80 parts by volume of acetonitrile, 110 parts by weight of sodium cyanate and 208 parts by weight of N-n-propyl-N-chloromethyl carbamic acid ethyl ester is boiled under reflux for one hour, until all of the chlorine has reacted. Titration of the NCO-content of the filtered solution shows a yield of 87 percent of the theoretical. Working up by distillation yields 158 parts by weight (73 percent of the theoretical) of N-n-propyl-isocyanatomethyl carbamic acid ethyl ester.

B.P.: 61° C/O.15 Torr and $n_D^{20}$: 1.4405; NCO-content: 22.55 percent (calculated 22.60 percent).

EXAMPLE 20

A mixture of 800 parts by volume of toluene, 200 parts by volume of acetonitrile, 220 parts by weight of sodium cyanate and 430 parts by weight of N-isobutyl-N-chloromethyl carbamic acid methyl ester is boiled under reflux for two hours, until all of the chlorine has reacted. Titration of the NCO-content of the filtered solution shows a yield of 92 percent of the theoretical. Working up by distillation yields 352 parts by weight (79 percent of the theoretical) of N-isobutyl-N-isocyanatomethyl carbamic acid methyl ester.

B.P.: 61.5° C/O.2 Torr and $n_D^{20}$: 1.4455; NCO-content: 22.40 percent (calculated 22.60 percent).

EXAMPLE 21

A mixture of 900 parts by volume of toluene, 100 parts by volume of acetonitrile, 250 parts by weight of sodium cyanate and 409 parts by weight of N-allyl-N-chloromethyl carbamic acid ethyl ester is boiled under reflux for 3½ hours, until all of the chlorine has reacted. Titration of the NCO-content of the filtered solution shows a yield of 95 percent of the theoretical. Working up by distillation yields 348 parts by weight (82 percent of the theoretical) of N-allyl-N-isocyanatomethyl carbamic acid methyl ester.

B.P.: 61–62° C./0.55 Torr and $n_D^{20}$: 1.4591; NCO-content: 24.60 percent (calculated 24.75 percent).

EXAMPLE 22

A mixture of 270 parts by volume of toluene, 30 parts by volume of acetonitrile, 60 parts by weight of sodium cyanate and 153 parts by weight of N-cyclohexyl-N-chloromethyl carbamic acid ethyl ester is boiled under reflux for three hours, until all of the chlorine has reacted. Titration of the NCO-content of the filtered solution shows a yield of 90 percent of the theoretical. Working up by distillation yields 126 parts by weight (80 percent of the theoretical) of N-cyclohexyl-N-isocyanatomethyl carbamic acid ethyl ester.

B.P.: 103° C./0.3 Torr and $n_D^{20}$: 1.4722; NCO-content: 18.5 percent (calculated 18.6 percent).

EXAMPLE 23

A mixture of 450 parts by volume of toluene, 50 parts by volume of acetonitrile, 100 parts by weight of sodium cyanate and 234 parts by weight of N-methyl-N-chloromethyl carbamic acid-o-chlorophenyl ester is boiled under reflux for four hours, until all of the chlorine has reacted. Titration of the NCO-content of the filtered solution shows a yield of 90 percent of the theoretical. Working up by distillation yields 188 parts by weight (78 percent of the theoretical) of N-methyl-N-isocyanato methyl carbamic acid-o-chlorophenyl ester.

B.P.: 123° C./0.15 Torr and $n_D^{20}$: 1.5331; NCO-content: 17.35 percent (calculated 17.45 percent).

EXAMPLE 24

A mixture of 540 parts by volume of toluene, 60 parts by volume of acetonitrile, 120 parts by weight of sodium cyanate and 304 parts by weight of N-methyl-N-chloromethyl carbamic acid-p-chlorophenyl ester is boiled under reflux for four hours, until all of the chlorine has reacted. Titration of the NCO-content of the filtered solution shows a yield of 91 percent of the theoretical. Working up by distillation yields 254 parts by weight (81 percent of the theoretical) of N-methyl-N-isocyanato methyl carbamic acid-p-chlorophenyl ester.

B.P.: 136–142° C./0.09–0.18 Torr and $n_D^{20}$: 1.5362; NCO-content: 17.35 percent (calculated 17.45 percent).

What is claimed is:

1. N - hydrocarbyl-N-isocyanatomethyl-carbamic acid esters represented by the formula

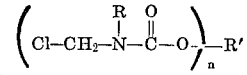

wherein R is a monovalent hydrocarbyl radical containing from 1 to 12 carbon atoms and is selected from the group consisting of aliphatic, cycloaliphatic and aromatic radicals, R' is a mono- or divalent hydrocarbyl radical containing from 1 to 15 carbon atoms and is selected from the group consisting of aliphatic, cycloaliphatic and aromatic radicals and $n$ is 1 or 2.

2. An N - hydrocarbyl-N-isocyanatomethyl-carbamic acid ester of claim 1 wherein R is methyl, R' is methyl and $n$ is 1.

3. A process for preparing the N-hydrocarbyl-N-isocyanatomethyl-carbamic acid esters of claim 1 comprising reacting from about 1 to about 1.25 mols of an alkali metal or alkaline earth metal cyanate with about 1 mol of an N-hydrocarbyl-N-halomethyl-carbamic acid ester represented by the formula

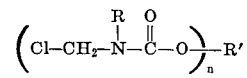

wherein R, R', and $n$ are as defined in claim 2 at from ambient temperature to about 230° C.

4. A process according to claim 3 wherein the reaction is conducted in the presence of an inert diluent.

5. A process according to claim 3 wherein the reaction is conducted at a temperature of from 60 to 160° C.

References Cited

Degering, G. F.: An Outline of Organic Nitrogen Compounds, Univ. Lithoprinter. 1950.

LORRAINE A. WEINBERGER, Primary Examiner

P. J. KILLOS, Assistant Examiner

U.S. Cl. X.R.

106—125; 252—8.57, 8.8; 260—78 A, 455 A, 465.4, 468 C, 471 C, 479 C